May 29, 1951 — E. M. MOSIER — 2,554,953
BUTTER DISPENSING DEVICE
Filed March 26, 1949 — 3 Sheets-Sheet 1
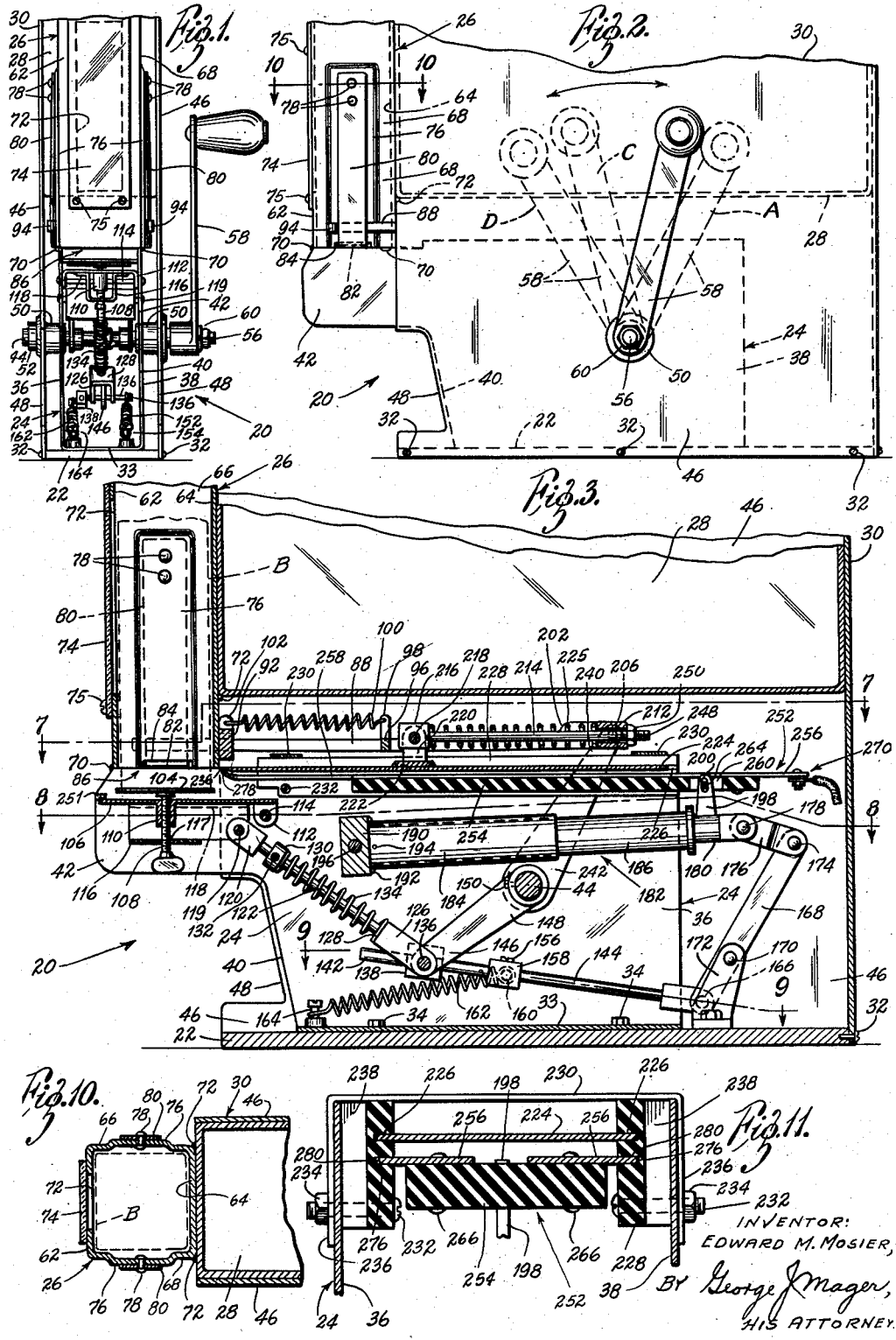
INVENTOR:
EDWARD M. MOSIER,
BY George J Mager,
HIS ATTORNEY.

May 29, 1951 E. M. MOSIER 2,554,953
BUTTER DISPENSING DEVICE
Filed March 26, 1949 3 Sheets-Sheet 2
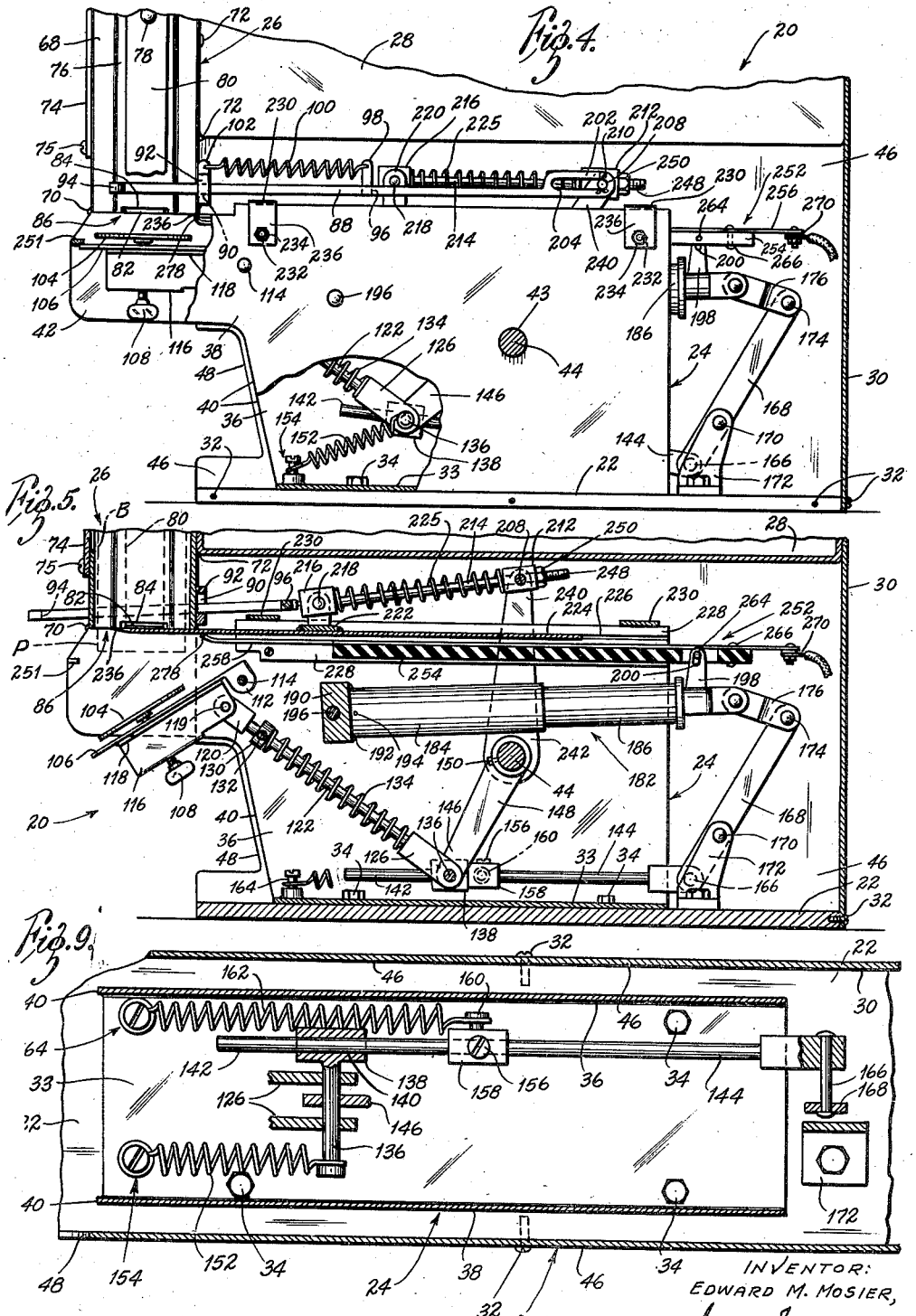
INVENTOR:
EDWARD M. MOSIER,
BY George J. Mager,
HIS ATTORNEY.

May 29, 1951
E. M. MOSIER
2,554,953
BUTTER DISPENSING DEVICE
Filed March 26, 1949
3 Sheets-Sheet 3
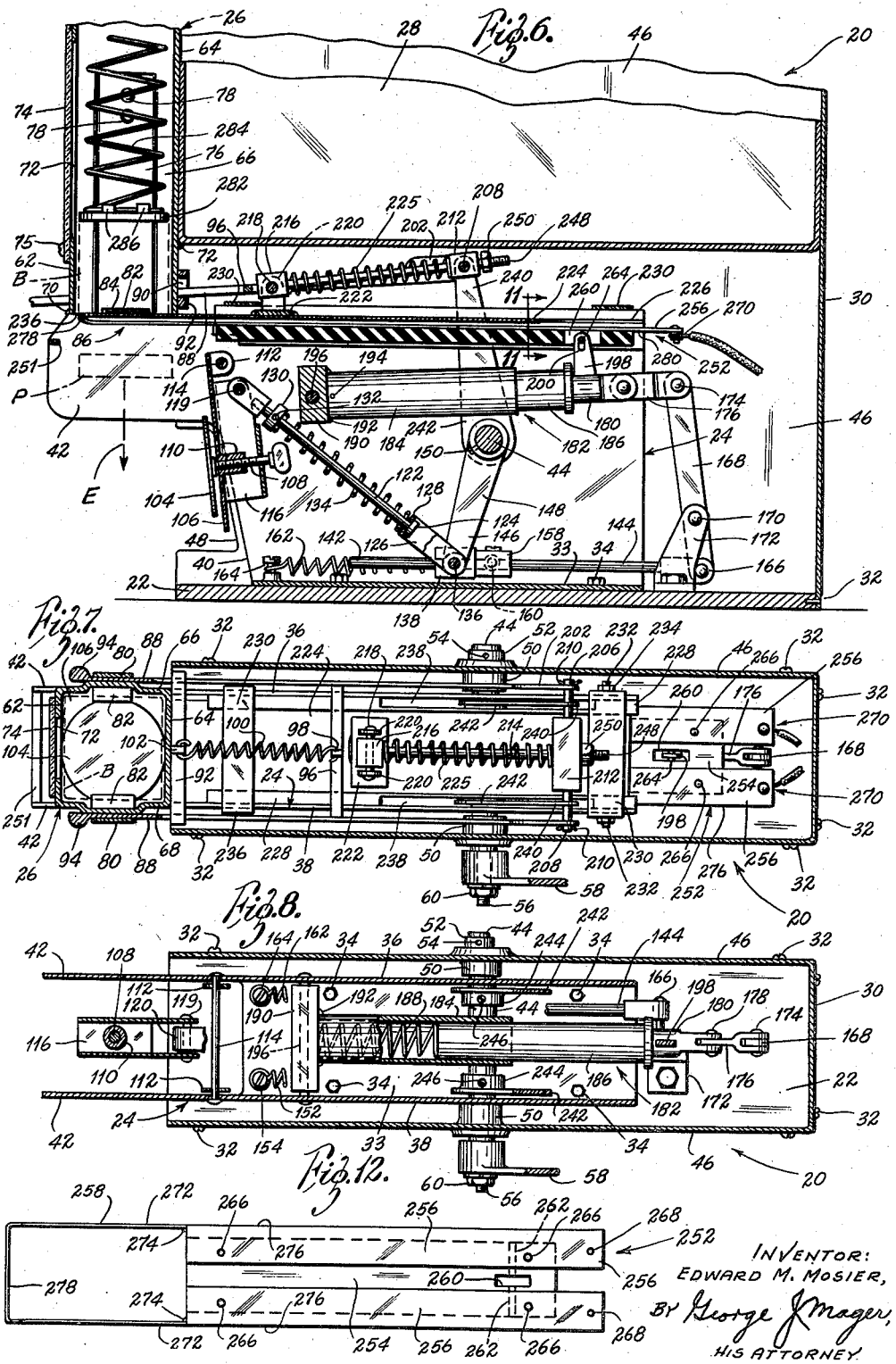
INVENTOR:
EDWARD M. MOSIER,
BY George J Mager,
HIS ATTORNEY Patented May 29, 1951

2,554,953

UNITED STATES PATENT OFFICE 2,554,953

BUTTER DISPENSING DEVICE

Edward M. Mosier, St. Louis, Mo.

Application March 26, 1949, Serial No. 83,704

8 Claims. (Cl. 31—21)

The present invention relates to a device for dispensing individual servings severed from a stick or block of butter.

Primarily designed for use in dining rooms, restaurants, hospitals, and so on, the invention may also be utilized to advantage in the home, as will be apparent.

The device is of such nature, that it may be operated quickly and easily to dispense a pad of butter having a predetermined thickness, means being included to vary the latter when desired.

From a santiary point of view, the invention leaves little to be desired. That is to say, conventional sticks or blocks or butter, as supplied by a dairy, may be inserted into the device, and dispensed in the form of individual pads untouched by human hands, and it may be said, sheltered from ambient contamination between servings.

These features are particularly desirable in restaurants and lunch rooms where the air is normally laden with smoke, germs, dust, and so on. In establishments of this type, butter pads to be served are usually cut in advance, as is understood, a supply considered adequate for the day's needs being deposited in an open container partially filled with water and pieces of ice.

Thus the pads float about in the container, sometimes for hours, continuously exposed to an unsanitary atmosphere. When a patron is to be served one or more pads, an attendant ordinarily jabs into the container with a fork or other pointed utensil to extract a pad or pads. As a result the servings are deformed, and frequently fractional portions must be pieced together to simulate a whole pad.

The present invention contemplates for its principal object, the provision of a compact device the use of which will overcome the disadvantages referred to above, and which in addition, includes features not found in other devices which have heretofore been designed with a view to attaining that end.

In a more or less general summary, it is noted that the present device includes a vertically disposed compartment or tube for the initial reception of one or more sticks of butter, means for urging said stick toward a dispensing opening, means for supporting the butter above said opening prior to and instantly after a pad is severed therefrom, means for releasing said stick into severing position when desired, means for severing a pad of butter from the stick, and means for insuring precipitation of the severed pad.

In addition, the device includes means for varying the thickness of a pad to be dispensed, spring means for automatically maintaining the operating parts in normal position, a manually operable handle for activating said operating parts, means for supplying a slight degree of heat to the precipitation insuring means, and a compartment or chamber adapted for the reception of suitable refrigeration whereby the butter may be maintained in a suitable cold state.

The tube or compartment for the column of butter is of such configuration in horizontal cross-section, that downward movements of the butter are facilitated. Normally, the stick of butter would descent by gravity. However, the invention provides means whereby such action is insured.

Obviously, as each individual severed pad is being dispensed, the remainder of the butter block must be supported above the dispensing opening. Novel means, in the form of a pair of resilient metal members attached on opposite sides of the delivery tube, are provided to automatically perform this function, and to release the butter into proper position for a dispensing operation when desired.

The severing means includes a horizontally slideable blade member supported on either side in slideways or insulated material, and adapted to be moved in two directions manually, and in one direction automatically.

The means for insuring non-adhesion of the severed pad to the underside of said blade includes a U-shaped wire member secured to a pair of spaced horizontally slideable metallic plates, provided with electrical connections whereby said wire is maintained in a warm condition.

The means whereby the thickness of each butter pad may be predetermined, comprises a disc or platform vertically adjustable toward or away from the dispensing opening by manipulation of a thumbscrew.

The device includes a plurality of coil springs, which as will appear, perform various functions in the inoperative, and in the operative positions of the movable parts.

The entire operation of shearing a pad from the butter block is accomplished by two simple movements of a manually operable lever, which is automatically returned to normal position quickly, following the discharge of such pad.

The delivery tube is preferably provided with visual means, in the form of a glass panel, whereby the operator can observe the position of the upper end of a stick of butter being dispensed, so that recharging, when required, is simplified, as is understood.

The refrigeration compartment referred to above, may be filled with cracked ice, or it may serve to enclose a cooling unit of a mechanical refrigeration system, and so on. In other words, the invention contemplates various means for temperature maintenance, so that no claim is made to any specific medium. A casing for enclosing the mechanism is provided.

Further advantages and features of the invention will be set forth in the description thereof to follow, reference being had also to the accompanying drawings, wherein is illustrated a preferable embodiment.

It is noted that, whereas the drawings portray, and the description to follow refers to a unitary device, the invention contemplates two or more similar devices positioned contiguously, and operable by a single hand lever.

In said drawings:

Fig. 1 is a front elevational view of the invention as it appears when normal, or not in use;

Fig. 2 is a right side elevational view thereof, the normal position of an operating lever being shown in solid lines, and alternate positions thereof being shown in broken lines;

Fig. 3 is a vertical sectional view on a slightly enlarged scale, with parts broken away, the view being taken longitudinally and generally centrally of the device, and illustrating the normal position of the parts therein appearing;

Fig. 4 is a right side elevational view of the device with the enclosing casing shown partly in section, and a portion of the mechanism supporting frame broken away, similar parts which appear being portrayed in the same positions they occupy in Fig. 3;

Fig. 5 is a view similar to Fig. 3 portraying the relative position of the parts as the blade member passes through the butter column;

Fig. 6 is a view similar to Figs. 3 and 5, illustrating the completion of a severing operation;

Fig. 7 is a horizontal sectional plan view taken approximately on line 7—7 in Fig. 3;

Fig. 8 is a similar view on line 8—8 in Fig. 3; some of the elements at a lower level being broken away in the interest of clarity;

Fig. 9 is a sectional view, on an enlarged scale, taken on line 9—9 in Fig. 3;

Fig. 10 is a horizontal sectional view, on a slightly enlarged scale, taken on line 10—10 in Fig. 2;

Fig. 11 is a vertical sectional view on an enlarged scale, taken on line 11—11 in Fig. 6;

Fig. 12 is an enlarged top plan view of a slidable follower or wiper assembly, per se.

With particular reference now to Figs. 1 through 8, the device generally is designated by the numeral 20. It includes a relatively heavy base plate 22, a generally U-shaped frame 24 secured thereto, a delivery tube or butter compartment 26 supported by portions of said frame, a refrigeration chamber 28 rigidly secured to said tube, and a casing 30 attached to said base, as by screws 32.

It is noted that since the device may continue upwardly to any desired height, the upper portions of the tube 26, chamber 28, and casing 30 are broken away in the drawings, and a conventional removable top cover for said tube and said casing are not shown.

As shown in the drawings, base plate 22 is of rectangular configuration, and frame 24 includes a web portion 33 secured to the base by tap bolts 34, and identical, spaced integral left and right side walls 36 and 38 respectively.

Each of said walls is recessed or cut away as at 40 to provide a forwardly projecting extension 42, and each has formed therein a circular opening 43 to accommodate a transversely extending, horizontally disposed operating shaft 44.

The side walls 46 of casing 30 are also recessed as at 48, and are provided with alined bearing bosses 50 for supporting the ends of said shaft which pass therethrough, and project beyond the exterior faces of said walls.

As appears particularly in Figs. 7 and 8, the left end of shaft 44 is provided with a collar 52, secured thereto by a set screw 54. To the opposite reduced end 56 of said shaft, the terminal portion of which is threaded, there is permanently secured a manually operable lever 58, as by a lock washer and nut assembly 60.

As best seen in Figs. 7 and 10, the upwardly extending delivery tube 26 is substantially square in a horizontal plane, and includes a front wall 62, rear wall 64, left side wall 66, and right side wall 68.

The lower edge of each side wall rests on the upper edge of one of the projections 42 to which it is secured by welding as at 70, or otherwise. Thus it should be evident that the tube 26 is rigidly secured to and supported by the frame member 24. In turn, the refrigeration chamber 28 may be welded, as suggested at 72, or otherwise secured to said tube. Thus transfer of refrigeration from said chamber to said tube is facilitated.

Front wall 62 is preferably provided with an elongated opening 72 permanently closed by a panel of glass 74, the latter attached as by screws or the like 75.

As best seen also in Figs. 1, 2, and 3, the lower portion of wall 66 and of wall 68 is extended laterally as at 76. Adjacent the upper end of each extension or integral rib 76, there is secured, as by rivets 78, a strap 80 of resilient metallic material, the lower end of which terminates in an inwardly projecting, horizontally disposed flange portion 82, adapted to project into the interior of tube 26 through a notch 84 formed in the lower edge of each side wall aforesaid.

Normally, the inturned flanges 82 project through the notches 84 to support the butter column. The means to release the column into pad-severing position, will now be described, with reference numeral 86 designating a dispensing opening.

With particular reference to Figs. 2, 3, and 7, it is noted that a horizontally disposed slide bar 88 is reciprocably disposed between each resilient strap member 80 and the adjacent face of a rib 76. The forward end portion of each slide bar is supported in a vertical slot 90 provided in a transverse block 92, welded or otherwise rigidly secured to the delivery tube 26, and terminates in an integral cam portion 94, preferably of the rounded configuration shown.

The pair of spaced slide bars 88 is connected by a transverse member 96, which includes an upward projection 98 to which is attached one end of a tension spring 100, the other end of which is secured to a similar projection 102 on the bar 92. The spring 100 normally maintains the slidebars forwardly, that is to the left, as viewed for example in Figs. 2 and 3.

Rearward movement of the slide bars 88 against the tension of spring 100 is accomplished by a slight rearward manipulation of lever 58, as will appear. At such times, cam elements 94 force the straps 80 outwardly to remove the supporting flanges 82 from beneath the column of butter, so that the latter may descend onto a horizontal table or platform 104, which, as best seen in Fig. 3, is adjustably mounted on a normally horizontally positioned tiltable plate 106.

The table member 104 has a depending thumbscrew 108 rigid therewith, the threaded portion of which engages the internally threaded depending boss portion 110 of said plate 106. The latter is provided with a pair of perforated ears 112 whereby it is pivotally supported on a transverse pivot pin 114, the ends of which are mounted in the walls 36 and 38 of the frame 24.

A U-shaped bracket 116, centrally apertured at 117 to accommodate thumbscrew 108, is provided with outstanding flanges 118 welded or otherwise rigidly secured to the underside of plate 106.

As seen to best advantage in Fig. 8, the bracket 116 has a pivotal connection 119 with the upper or head portion 120 of an angularly disposed rod 122, the lower end of which terminates in an enlarged abutment portion 124, as portrayed in Fig. 6.

A clevis is designated by numeral 126, its bight portion 128 being apertured to slidably accommodate the rod 122, and a movable collar 130 is seen to be attachable at a selected point to the rod 122 by a set screw 132.

Interposed between said collar and portion 128 of clevis 126, is a coil spring 134 about the rod 122, and the legs of said clevis are apertured to receive a pivot pin 136, which, as particularly seen in Fig. 9, projects laterally from the right side of a slide block member 138. The block 138 has a longitudinal bore 140 through which passes the free end portion 142 of a rod 144, as also best seen in Fig. 9.

And, as appears particularly in said view, the pivot pin 136 also passes through the lower apertured end 146 of an arm 148 rigidly affixed to the operating shaft 44 as by a set screw 150, or otherwise. The arm 148 is positioned approximately centrally of the device, the lower end thereof aforesaid being disposed between the legs of clevis 126.

The pivot pin 136 extends laterally to the right beyond the clevis, and secured thereto adjacent its free extremity is one end of a spiral spring 152, the other end of which is attached to the base portion 32 of frame 24, as indicated at 154.

Adjustably secured to rod 144, as by a set screw 156, is an abutment member 158, from the left side of which projects a pin 160 to which is attached one end of another coil spring 162, the opposite end of which is also attached to the web portion 32 of frame 24, as indicated at 164.

The rear end of rod 144 has a pivotal connection 166 with the lower end of a link 168 pivotally mounted as at 170 on the upstanding portion of a bracket 172 secured to the base plate 22. The upper end of said link has a pivotal connection 174 with the bifurcated end of a second link 176, the other end of which is pivotally attached at 178 to the rear end portion 180 of a cushioning or snubbing device, generally designated by numeral 182.

The device 182 includes a cylinder 184, a telescopically disposed piston member 186, and a spring 188, the latter interposed between the piston and a transversely disposed rectangular block 190 to which the cylinder 184 is welded as suggested at 192, or otherwise secured. An exhaust port 194 is provided in the cylinder at the forward end thereof, and the block 190 is pivotally mounted on a rod 196 extending between, and supported by the walls 36 and 38 of the frame 24.

The rearwardly extending portion 180 above referred to, is rigid with said piston 186, and with an upwardly extending arm 198 provided with an elongated slot 200, the purpose of which will be set forth hereinafter.

Reverting now to the slide bars 88, and with particular reference to Fig. 4, it is noted that the rear extremity of each of said bars is enlarged as at 202 to provide an elongated horizontal slot 204. Projecting through slot 204 of the left hand bar 88 is a pin 206, and through slot 204 of the right hand bar, a similar pin 208. Lateral displacement of said bars relative said pins is obviated as by cotter pins 210, or otherwise.

The pins 206 and 208 are rigid with a horizontally and transversely disposed member 212, slidably mounted, as shown especially in Fig. 3, on the rear end of a longitudinal rod 214. The forward end of said rod has a head portion 216 integral therewith, the latter being pivotally connected as at 218, to a pair of upstanding ears 220 rigid with a plate 222 which is welded, or otherwise permanently secured, to the upper surface of a blade member 224. Interposed between head portion 216 and slide block 212 is a coil spring 225 about rod 214.

The blade 224 is of rectangular configuration, and, as appears particularly in Fig. 11, is slidably supported along either side edge in slideways 226, provided in spaced rails 228, each of which is contiguous to one of the side walls 36 or 38 of supporting frame 24, and extends from the rear edge of said frame forwardly to a point approximately above the transverse pin 114.

The rails 228 are maintained in place, and the free upper ends of walls 36 and 38 are simultaneously reinforced by a pair of inverted U-shaped brackets 230 in combination with screws 232 and nuts 234.

As shown particularly in Fig. 11, the rails are flush with the upper edges of said walls, and the brackets 230 have depending leg portions 236 through each of which a screw 232 passes. Each screw 232 also passes through the adjacent wall and a rail 228, to receive a nut 234. As will appear, the forward bracket 230 also serves as an abutment member. The leading edge of blade 224 is designated 236, and as shown in the drawings, the blade slides against the bottom edge of tube 26.

As shown in Figs. 7 and 11, each side rail 228 is provided with a longitudinal slot 238. Extending upwardly through each slot 238 is the upper end 240 of an arm 242, the lower end of which is provided with an integral boss 244 through which passes a set screw 246, whereby arm 242 is secured to the operating shaft 44.

The upper end 240 of each arm 242 is perforated. Through the perforation of the left side arm extends the pin 206; through the perforation of the right arm extends the pin 208. The rear end of rod 214 is threaded as at 248, to receive an adjustment nut 250. Numeral 251 indicates a transversely extending abutment member extending between the inner faces of walls 36 and 38 to obviate upward movement of plate 106 beyond a horizontal plane.

In Fig. 12 there is shown a top plan view of a slideable assembly 252 which includes a rectangular block of insulation 254, a pair of spaced metallic plates 256, and a U-shaped wire member 258.

Block 254 is of a width to clear the heads of screws 232, as seen in Fig. 11, and has formed therein, adjacent the rear end thereof, an elongated vertical slot 260 to accommodate the upper end of arm 198. Said block has also formed therein alined transverse apertures 262, and through these apertures and slot 260 of arm 198 passes a horizontal pin 264.

Plates 256 are riveted, as at 266, or otherwise secured to the upper surface of block 254. A perforation 268 is provided adjacent the rear end of each plate for the reception of a suitable electrical connection 270.

As is illustrated only in Fig. 12, the terminal ends of the leg portions 272 of wire member 258 are welded as at 274 to plates 256, so as to form continuations of the side edge portions 276 thereof. The bight or transverse portion 278 of the wire member is bent angularly upwardly, as seen particularly in Figs. 5 and 6, to contact the underside of blade 224.

With reference especially to Fig. 11 it is noted that the assembly 252 is slidably supported in guideways 280 formed in the rails 228. It is here noted that these guideways, as well as the guideways 226 for the blade, extend longitudinally from the forward to the rear ends of rails 228.

Illustrated only in Fig. 6, wherein it is assumed that the top of a column of butter B, shown in broken lines, has descended to a level not far above the dispensing opening 86, is a preferred means for insuring the downward movement of said column following each pad-severing operation.

The means referred to includes a suitable plate or follower 282, and a compression spring 284 interposed between said plate and a removable top cover (not shown), for the delivery tube 26. The lower end of spring 284 is attached to plate 282 as at 286, so that in reloading the delivery tube with butter, elevation of the spring will automatically elevate said plate, as is understood.

The spring 284 has an expansible length commensurate with the selected height of the delivery tube, being so designed that the plate 282, in its lowermost position, occupies a plane slightly above the upper surface of the reciprocable blade 224.

Operation

In describing the operation of the invention, it is assumed that the relative position of the parts, as shown in Fig. 3, is representative of the normal, or not in use, status of the device. Manually operable lever 58 occupies the full line position portrayed in Fig. 2; platform 104 is in desired position relative to dispensing opening 86; inturned flange members 82 project into the interior of the delivery tube 26; blade 224 is rearwardly disposed; and as stated, the balance of included elements occupy the positions portrayed.

It is further assumed, that cracked ice, or mechanical refrigeration may be enclosed within chamber 28, and that butter compartment 26 is empty; that the leads from the electric terminals 270 have been connected to a low voltage power source, or will be so connected when dispensing operations are initiated.

Assuming now that it is desired to dispense individual servings or pads, one or more sticks of butter B, depending upon the height of delivery tube 26, are inserted into the latter. Thereupon, the follower plate 282 and spring 284 assembly is inserted, said spring being compressed by the application of a lid or cover to the top of the tube, as is understood.

Slide bars 88 at this time, occupy the position most clearly seen in Fig. 7, so that inturned flanges 82 of resilient strap members 80 project into tube 26 through slots 84, to support the butter column B at the bottom thereof. It is noted that the butter supporting flanges 82 are very thin, being of approximately razor blade thickness, so that the bottom face of the butter column is substantially flush with the bottom edges of the delivery tube, and that the blade member 224 reciprocates along said bottom edges, as previously stated.

Thus it is easy to predetermine the thickness of the pads to be severed from the column, by observing the distance between the lower end of tube 26 and the upper surface of table 104. In the drawings, the latter is illustrated in an adjusted position for dispensing pads of a slightly greater thickness than customarily served. Manipulation of thumbscrew 108 will vary the thickness of the pads, as is evident.

Assuming that the operator now pushes handle 58 rearwardly a slight distance, to the right hand broken line position A thereof shown in Fig. 2, this action causes the bars 88 to move rearwardly also, whereby the rounded cams 94, force the straps 80 outwardly, and thus withdraw the supporting flanges 82 from beneath the column B, so that it descends onto table 104.

The rearward movement of the bars 88 is accomplished in the following manner. As operating shaft 44 is turned clockwise, arms 242 move clockwise also, as does the block 212 with its pins 206 and 208. The latter engage the rear ends of slots 204, whereby bars 88 are brought rearwardly against the tension of spring 100. Movement of the bars 88 in either direction is facilitated by the slots 90 formed in the support 92.

It is apparent that simultaneously with the action just described, blade member 224 also moves rearwardly a slight distance in its slideways 226. This is so because block 212 is in contact with nut 250 on rod 248, and the forward end of said rod has a connection with said blade.

It is also apparent that at the same time, arm 148 moves forwardly, together with clevis 126 and block 138. This results however only in a slight shift in the relative position of some parts. Because of the aperture in bight portion 128 of the clevis, the latter rides upwardly a short distance along rod 122 and merely further compresses spring 134 momentarily, as is understood, and block 138 merely slides forwardly a slight distance on the free end of rod 144.

As the operator next pulls lever 58 forwardly, that is counterclockwise as in Fig. 2, to the broken line position designated C, the severing operation is approximately completed, in that, as appears in Fig. 5, the leading edge 236 of blade 224 has passed almost entirely through the butter column B. It is also seen that table 106 has been swung downwardly about pivot 114, and that the almost severed pad P, is suspended in the dispensing opening 86.

It is further noted that as lever 58 was turning counterclockwise, spring 100 caused the arms 88 to slide forwardly, thus permitting the flanges 82 to spring inwardly into column supporting position. The manner in which said last named action is facilitated, will be set forth hereinafter.

In addition to what has been explained, movement of lever 58 from its A to its C position resulted in shifting the relative positions of other elements. Thus, arm 148 has moved rearwardly to bring slide block 138 into contact with abutment block 158 on rod 144. Spring 152, which is so designed as to normally maintain lever 58 in its Fig. 2 full line position, has been extended, and rod 144 has been swung about its pivot 166 to an approximately horizontal position.

When the lever 58 reaches its D position, the parts occupy the position shown in Fig. 6, with the leading edge 236 of blade 224 entirely through the butter column, and at the limit of its forward stroke.

In other words, at the time the blade member reaches its Fig. 6 position, the ears 220 strike against the front bracket 230, to arrest further forward movement of said blade, but because of slots 204 in the now stationary slide bars 88, and the slidable mounting of block 212 on rod 214, arms 242 continue to move to the left, further compressing spring 225 as lever 58 is brought to its D position.

During this time, arm 148 is moving to the right, further extending spring 152, and causing rod 144 to move rearwardly as slide block 138 is in contact with fixed abutment member 158. Rearward movement of said rod causes the upper end of link 168 to move forwardly about pivot 170, whereby piston 186 moves to the left against the spring 188.

As the piston moves to the left, the follower, or wiper assembly 252 of Fig. 12 moves to the left also, because of the pin and slot connection in the arm 198. Thus the upwardly biased wire member 258, specifically the bight portion 278, wipes the underside of the blade 224 to positively shear the pad P therefrom, in the event the latter has adhered thereto, as is understood.

In other words, although the blade 224 is normally maintained warm because portion 278 of the wire is constantly in approximate contact therewith, the said blade may have become chilled in its passage through the butter, and the severed pad P may cling to the underside thereof. The warm wire member in that event, effects the positive dislodgement of said pad, so that it drops as indicated by the arrow E in Fig. 6.

Obviously, the severed pad will frequently fall by gravity after the blade has completed its forward travel, but the wiper assembly 252 eliminates the possibility of the pad being carried rearwardly on the underside of said blade, as the operator releases his hold on handle 58.

The automatic return of said handle from its D to its solid line, or normal position of Fig. 2, through the combined action of springs 152 and 188 should be evident from the description heretofore. It should also be evident that the automatic return of said lever again places the mechanism in the Fig. 3 position, ready for a repetition of the cycle.

The observations to follow are given with a view to clarifying the operations.

At the completion of a dispensing operation, the supporting plate 106 for the table 104 occupies the retracted position shown in Fig. 6, so that descent of pad P is unobstructed.

Since frame 24 is recessed as at 40, and casing 30 as at 48, a saucer or other receptacle may be positioned beneath the dispensing opening 86 to receive the butter slices.

Although provision has been made for refrigeration, it should be manifest that if butter is being cut continuously, or with but brief intervals between dispensings, refrigeration may not be required.

The flanges 82 are very thin, as stated, but the resilient straps 80 are sufficiently substantial to at least bite into the butter column when cams 94 move forwardly. Then, as the leading edge 236 of the blade member passes beyond the flanges, these automatically snap into place.

Abutment 251 is provided to insure horizontal positioning of the table supporting plate 106, and portion 128 of clevis 126 is apertured so that the latter may slide upwardly along rod 122 against the force of spring 134, as previously set forth, whereby said plate is more firmly held against said abutment, as the severing operation is commenced.

Rails 228 having the slideways 226 and 280 formed therein, are of insulating material, as is spacer block 154, because of the electrical heating means. It is here noted that under certain conditions it may not be necessary to heat the wiper assembly at all, or that means may be provided whereby said assembly is heated only intermittently, or heated only during reciprocations thereof.

The snubber device 182 is provided primarily to assist spring 152 in preventing the operator from pulling hand lever 58 forward too rapidly, and to aid in the smooth automatic return thereof to normal position.

Obviously the embodiment illustrated and described may admit of modifications without departing from the principles of the invention, which is limited only by the appended claims.

What is claimed is:

1. In a butter cutting and dispensing device of the character described including a vertical tube for the reception of a column of butter and means for delivering said butter downwardly to a dispensing opening at the lower end of said tube: a pair of resilient metal straps secured at their upper ends to opposite side walls of said tube; a notch formed in the lower edge of each said side wall; a thin horizontally disposed flange portion formed on the lower end of each strap and adapted normally to project through one of said notches into the interior of said tube to support the butter column; a normally horizontally disposed table below said dispensing opening and means for positioning said table a predetermined distance below said opening; a pair of horizontally reciprocable cam members for withdrawing said strap flanges from beneath the butter column during rearward movements of the cam members to permit said column to descend onto said table; a reciprocable blade member supported in longitudinal slideways and adapted to pass through the butter column to sever a slab from the body portion thereof; a reciprocable wiper assembly including a wire portion adapted to slide along the underside of said blade member; and manually operable means for reciprocating said cam and blade members, and said wiper assembly.

2. In a device of the character described including a butter dispensing opening: a transversely supported operating shaft; a downwardly extending arm secured to said shaft centrally thereof; a pair of upwardly extending arms also secured thereto in spaced relation; a table and means including a clevis for normally maintaining same in horizontal position beneath said dispensing opening; a first pivotal connection at the lower end of the central arm with said clevis; a wiper assembly and means including a slide block for reciprocating said assembly across the dispensing opening; a second pivotal connection at the lower end of the central arm with said block; a blade member and means including a slide block for reciprocating said member across said opening; a first pivotal connection at the upper end of each spaced arm with the latter block; means for normally supporting a column of butter above said opening; a pair of spaced slidably mounted cam bars for withdrawing said column supporting means; a second pivotal connection at the upper end of each spaced arm with one of said bars; and an operating lever secured to one end of said shaft for activating said three arms simultaneously.

3. In a device of the character described, said device including a delivery tube adapted to receive blocks of butter, a refrigeration compartment contiguous to said tube, and spring operated means for feeding the butter downwardly toward a dispensing opening: means for supporting said block with its lowermost surface immediately above said opening, said means comprising a pair of resilient strap members permanently secured at their upper ends to opposite side walls of said tube and terminating at their lower ends in thin inturned horizontal flange portions normally adapted to project into the interior of said tube; and means for withdrawing said flange portions from the interior of said tube, said means comprising a pair of spaced slide bars reciprocably mounted in vertical slots provided in a horizontally disposed block rigidly attached to said tube, a cam on the forward end of each bar, an enlarged portion provided with an elongated slot on the rear end of each bar, a transverse member rigid at each end with one of said bars, a tension spring secured at one end to said block and at the other end to the transverse member for normally maintaining said bars in their forward position, a rotatably supported operating shaft, a pair of spaced arms secured thereto, a pivotal connection between the upper end of each spaced arm and the slotted end of one bar, and a lever secured to one end of said shaft for reciprocating said slide bars.

4. In a device of the character described, a horizontally disposed blade for severing individual pads from a block of butter; longitudinal guideways for slidably supporting said blade; a U-shaped frame for supporting the guideways in horizontally spaced relation; a normally horizontal rod terminating at one end in a head portion and having a block slidably mounted thereon adjacent the threaded rear end thereof; a compression spring about the rod and interposed between the head portion thereof and said block; a pivotal connection between said head portion and a member rigidly attached to the upper surface of the blade; a nut engaging the threaded end of said rod for maintaining said block in selected position on the rod; a rotatably supported operating shaft; a pair of spaced upwardly extending arms the lower ends of which are rigid with said shaft; a pivotal connection between said block and the upper end of each arm; and a lever attached to one end of the operating shaft for activating same to reciprocate said blade.

5. In a device of the character described including a base, a horizontally disposed wiper assembly for dislodging an individual serving, severed from a stick of butter by a horizontally reciprocable blade, from the underside of said blade; spaced longitudinal guideways for slidably supporting said assembly; a U-shaped frame rigid with the base for supporting the guideways; a cushioning device pivotally mounted on a transverse rod supported in said U-shaped frame; and manually operable means for effecting forward movements of said assembly; said means including a pivotally mounted linkage comprising a first upwardly and angularly disposed link pivotally mounted near its lower end in a stationary bracket secured to said base, a second link pivotally connected at one end to the upper end of the first link and at its other end to a rearwardly extending portion of said cushioning device, an upwardly projecting arm rigid with the rearwardly extending member of the cushioning device aforesaid and having an elongated slot formed therein, a horizontally disposed pivot pin passing through said slot and through the rear portion of a rectangular block included in the wiper assembly, a substantially horizontally disposed rod having a pivotal connection at its rear end with the free lower extremity of said first link, a first abutment block adjustably secured to the rod, a second block slidably mounted on the rod forwardly of the first block, a transverse operating shaft rotatably supported in the U-shaped frame, a depending arm having a rigid connection with said shaft at its upper end and a pivotal connection with the slide block at its lower end, and an operating lever secured to one end of said shaft, whereby forward manipulation of said lever will cause the slide block to strike against the abutment block to activate said linkage.

6. In a device of the character described including a base, a horizontally disposed wiper assembly for dislodging an individual serving, severed from a stick of butter by a horizontally reciprocable blade, from the underside of said blade; spaced longitudinal guideways for slidably supporting said assembly; a U-shaped frame rigid with the base for supporting the guideways; a cushioning device pivotally mounted on a transverse rod supported in said U-shaped frame; and means for automatically effecting rearward movements of said assembly; said means including a pivotally mounted linkage comprising a first upwardly and angularly disposed link pivotally mounted near its lower end in a stationary bracket secured to said base, a second link pivotally connected at one end to the upper end of the first link and at its other end to a rearwardly extending portion of said cushioning device, an upwardly projecting arm rigid with the rearwardly extending member of the cushioning device aforesaid and having an elongated slot formed therein, a horizontally disposed pivot pin passing through said slot and through the rear portion of a rectangular block included in the wiper assembly, a substantially horizontally disposed rod having a pivotal connection at its rear end with the free lower extremity of said first link, a block adjustably secured to the rod, and a tension spring secured at one end to the U-shaped frame and at its other end to said abutment block.

7. The device of claim 5, wherein the wiper assembly includes a rectangular block of insulation: a pair of spaced metallic plates secured to the upper surface thereof; an elongated vertical slot adjacent the rear end thereof formed in said block to accommodate the upper end of said upwardly projecting arm rigid with the rearwardly extending member of said cushioning device; a pair of alined transverse apertures for the reception of said horizontally disposed pivot pin passing through the elongated slot in said arm; a U-shaped wire member having the terminal ends of its leg portions rigidly attached to the side edge portions of said plates, and its bight portion bent angularly upwardly; and a perforation provided adjacent the rear end of each spaced plate for the reception of an electrical connection whereby a predetermined quantity of heat may be continuously or intermittently supplied to said wire member.

8. The device of claim 5, wherein said cushioning device includes a cylinder secured at one end to a transversely disposed block pivotally mounted on a horizontal pin the ends of which are supported in said U-shaped frame; a piston reciprocable in said cylinder; a compression spring within the cylinder and interposed between said block and the forward face of the piston for normally urging the latter rearwardly; an exhaust port adjacent the forward end of the cylinder; and the rearwardly extending portion aforesaid, the latter being rigid with said piston.

EDWARD M. MOSIER.

REFERENCES CITED

The following references are of record in the file of this patent:

UNITED STATES PATENTS

| Number | Name | Date |
|---|---|---|
| 1,690,480 | Donnellan | Nov. 6, 1928 |
| 2,104,041 | Johnson et al. | Jan. 4, 1938 |
| 2,174,772 | Berg | Oct. 3, 1939 |
| 2,228,974 | Portwood | Jan. 14, 1941 |
| 2,311,618 | Coleman | Feb. 16, 1943 |
| 2,362,722 | Rush et al. | Nov. 14, 1944 |
| 2,471,399 | Dodge | May 24, 1949 |